Jan. 1, 1952  W. W. MOE  2,581,124

ALTERNATING VOLTAGE COMPRESSION NETWORK

Filed July 23, 1947

INVENTOR
WILLIAM WEST MOE
BY
Campbell, Brumbaugh & Free
HIS ATTORNEYS

Patented Jan. 1, 1952

2,581,124

UNITED STATES PATENT OFFICE 2,581,124

ALTERNATING-VOLTAGE COMPRESSION NETWORK

William West Moe, Stratford, Conn., assignor to Time, Inc., New York, N. Y., a corporation of New York Application July 23, 1947, Serial No. 763,050

1 Claim. (Cl. 178—44)

The present invention relates to electronic computers and more particularly to new and improved electronic computer apparatus which is adapted to receive a plurality of input signals representative of different values of a plurality of variables and to provide at least one variable representative of a predetermined function of the variables.

Electronic computers are known in which conventional converter or mixer type tubes are employed to multiply two variables together and to provide an output proportional to their product. The invention constitutes an improvement over computers of this type in that it enables solutions to be obtained of functions such as the quotient of one variable and a second variable to a constant power, i. e., $$Z = K\frac{x}{y^n}$$

The principal object of the invention is to provide new and improved electronic computer apparatus that is capable of providing an electrical output that is accurately representative of functions such as the quotient of a variable divided by a second variable to a fixed exponent, for example.

Another object of the invention is to provide new and improved electronic computer apparatus of the above character which is simple and reliable in operation.

According to the invention, electronic computer apparatus is provided which comprises a conventional converter or mixer tube, one of the control grids of which receives an electrical input representative of one of the variables while another control grid receives an electrical input representative of the reciprocal of another variable to a fixed exponent. The latter electrical input is created by feeding an electrical input proportional to said other variable to a compression circuit which compresses the signal to a desired function.

In one embodiment, a voltage representative of a variable is fed directly to one of the control grids of a conventional converter tube. A current representative of a second variable is compressed to a desired function in a suitably designed compression circuit, the output voltage of which is used to bias another grid of the converter tube. In this fashion, the converter tube provides an electrical output representative of the desired function of the variables.

In another embodiment, a signal input representative of a variable is subjected to compression in a suitably designed circuit to provide an output proportional to a given function of the signal input.

The invention may be better understood from the following detailed description of several representative embodiments, taken in conjunction with the accompanying drawings, in which.

While the novel electronic computer comprising the present invention may be applied to a wide variety of uses, it will be described herein as used in electronic color correction apparatus for making color separation negatives from Kodachrome transparencies, for example. In that application, an alternating voltage having a frequency of 7680 cycles, modulated by signal voltage which may vary from 0 to 1000 cycles in frequency is developed.

For proper operation of this apparatus, it is necessary to provide a voltage output proportional to the signal input voltage and inversely proportional to a predetermined power of a second voltage, also having a frequency of 7680 cycles and modulated by a correction voltage, generally designated the "mask" voltage, which may vary from 0 to 1000 cycles in frequency. A representative electronic circuit suitable for accomplishing this result in accordance with the invention is shown in Figure 1 of the drawings.

Figure 1:
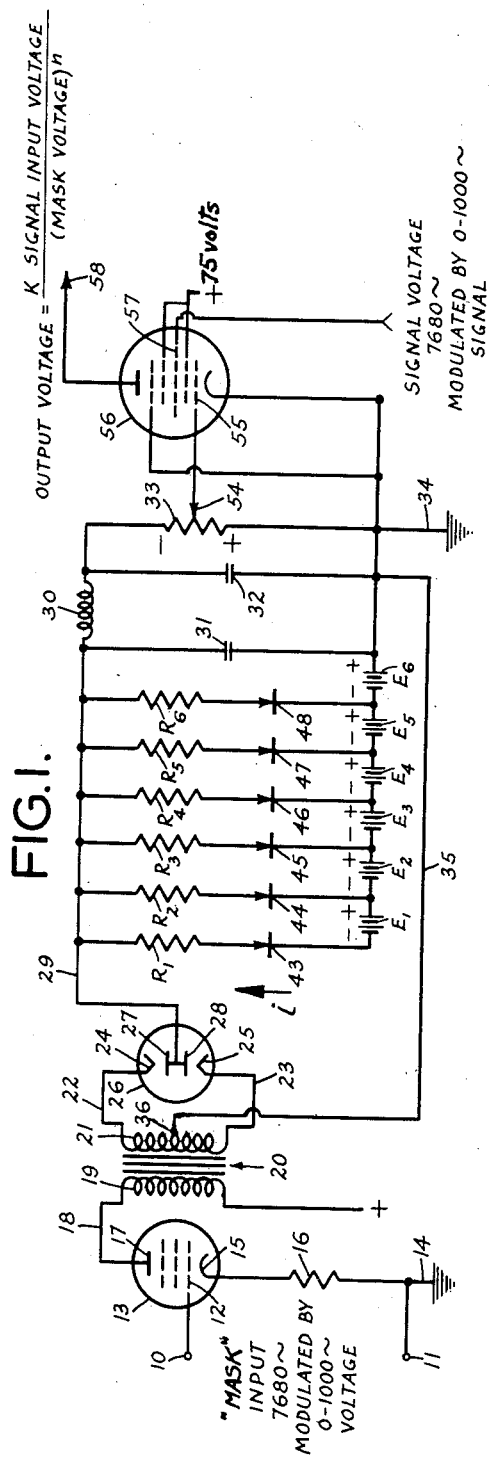
Figure 1 is a schematic diagram of electronic computer apparatus constructed according to the invention.

Referring to Figure 1, the above-mentioned second alternating voltage of 7680 cycles frequency, modulated by the "mask", voltage is impressed upon the input terminals 10 and 11 which are connected to the control grid 12 of a conventional pentode 13 and to ground at 14, as shown. The cathode 15 of the pentode 13 is connected in series with a cathode resistor 16 to the ground 14. The plate 17 of the pentode 13 may be connected by a conductor 18 to the primary winding 19 of a conventional transformer 20, the other terminal of which is connected to a source of plate voltage (not shown).

The ends of the secondary winding 21 of the transformer 20 are connected by conductors 22 and 23, respectively, to the cathodes 24 and 25 of a conventional full-wave rectifier 26. The plates 27 and 28 of the rectifier 26 are connected together and to a conductor 29 which feeds the rectified output to a low pass filter circuit comprising an inductance 30 and the shunt condensers 31 and 32. The output of the filter circuit is impressed upon a load resistor 33 which is connected at one end to the inductance 30 and at its other end to ground at the point 34. The rectifier circuit is completed by a conductor 35 which is connected at one end to the ground 34 and at its other end to a mid-tap 36 on the secondary winding 21 of the transformer 20.

It will be understood that the rectified current fed into the conductors 29 and 35 will be proportional to the instantaneous amplitude of the "mask" signal applied to the terminals 10 and 11. In order to provide a signal which varies to a predetermined power "$n$" of the amplitude of the "mask" voltage, a compression circuit is connected across the conductors 29 and 35. This compression circuit comprises a plurality of shunt circuits, including the linear resistors $R_1$, $R_2$, $R_3$, $R_4$, $R_5$ and $R_6$, the rectifying devices 43, 44, 45, 46, 47 and 48 and the sources of biasing voltage $E_1$, $E_2$, $E_3$, $E_4$, $E_5$ and $E_6$.

The rectifying devices 43, 44, 45, 46, 47 and 48 are preferably crystal type diodes. Crystal diodes are similar to vacuum type diodes in that they have very high impedance when their anode is negative with respect to the cathode and very low impedance when the anode is made positive.

Figure 2:
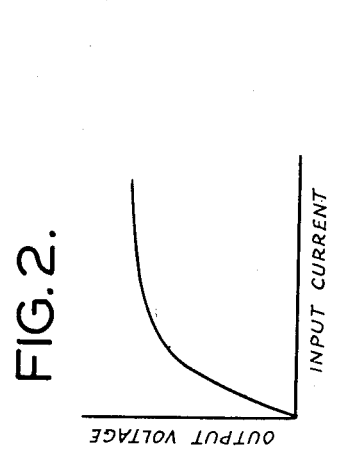
Figure 2 is a typical curve illustrating the variation of the output of the compressor circuit with input.

The values of the resistors and biasing voltages in the compression circuit are so chosen that, for a given signal voltage applied to the grid 57, the output voltage appearing at the conductor 58 varies inversely in proportion to the $n$th power of the "mask" voltage. A representative curve showing a typical output voltage-input current curve for a compressor circuit of the type shown in Figure 1 is illustrated in Figure 2. In a typical circuit in which "$n$" was .56, the following values were used for the several resistors and biasing voltages in the compressor circuit:

| Volts | Ohms |
|---|---|
| $E_1=1$ | $R_1=0$ |
| $E_2=1$ | $R_2=100$ |
| $E_3=1$ | $R_3=1800$ |
| $E_4=2$ | $R_4=2700$ |
| $E_5=6$ | $R_5=2700$ |
| $E_6=6$ | $R_6=47,000$ |

At very low values of input current and voltage, the crystal diodes are all biased to be non-conductive and the only load is the low-pass filter terminated by the load resistor 33. As the input current is raised, the compressor voltage will equal, then exceed, the bias voltage $E_6$ applied to the crystal diode 48. The resistance of the crystal diode will drop to a low value, thus connecting the resistor $R_6$ in parallel with the load resistor 33 and giving a lower net resistance in series with the output of the rectifier 26.

As the current and voltage are increased still further, the biasing voltages applied to the crystal diodes 47, 46, 45, 44 and 43, will successively be overcome, thus connecting the resistors $R_5$, $R_4$, $R_3$, $R_2$ and $R_1$ successively in parallel with the resistor $R_6$. As a result, the voltage drop across the resistor 33 will increase rapidly at first as the current is increased from zero, then more slowly as the current is increased still further, as indicated generally by the graph shown in Figure 2. By using six diodes, as shown in Figure 1, seven points may be obtained on the curve shown in Figure 2. More or fewer shunt circuits can be employed, depending upon the accuracy desired.

The load resistor 33 is preferably a potentiometer having a movable contact 54 which is connected to the control grid 55 of a conventional converter tube 56. The original signal voltage of 7680 cycles, modulated by a signal which may vary from 0 to 1000 cycles in frequency, is impressed upon the third grid 57 of the converter tube 56, thus providing an output at the conductor 58 which is proportional to the product of the signal voltage and inversely proportional to "mask" voltage applied to the terminals 10 and 11.

By virtue of the connections shown, the upper end of the resistor 33 is negative and the lower end is positive so that an increasing signal input to the terminals 10 and 11 acts to make the bias applied to the control grid 55 more negative. Thus, for the proper operation of the apparatus, the output of the tube 56 at the terminal 58 is directly proportional to the signal input voltage and is inversely proportional to the "mask" voltage to the exponent $n$.

Figure 3:
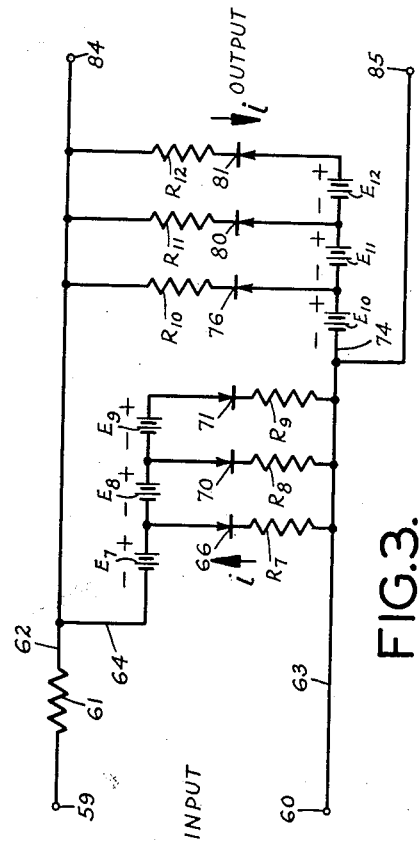
Figure 3 illustrates schematically a further modification of the invention.

If it is desired to obtain a signal output proportional to a predetermined function of a given alternating signal input such as to a predetermined exponent $n$, for example, a compressor circuit of the type shown in Figure 3 may be employed. In Figure 3, the alternating signal input is applied to the input terminals 59 and 60. A voltage dropping resistor 61 is connected in series with the terminal 59 and a plurality of shunt circuits are connected across the conductors 62 and 63, as shown.

Compression of positive half-cycles of the alternating current wave is effected by a circuit including a conductor 64 connected to the conductor 62 and having in series therewith a source of biasing voltage $E_7$, a crystal diode 66 of a resistor $R_7$ which is connected to the conductor 63. Connected in shunt with the crystal diode 66 and the resistor $R_7$ are a plurality of shunt circuits comprising the biasing batteries $E_8$ and $E_9$, the crystal diodes 70 and 71 and the resistors $R_8$ and $R_9$, connected as shown.

Compression of negative half-cycles of the alternating current wave is accomplished by a second shunt circuit, including a conductor 74 connected to the conductor 63 and having in series therewith a source of biasing voltage $E_{10}$, a crystal diode 76 and a resistor $R_{10}$ which is connected to the conductor 62. Further degrees of compression are provided for the negative half-cycles by other shunt circuits, including the sources of biasing voltage $E_{11}$ and $E_{12}$, the crystal diodes 80 and 81 and the resistors $R_{11}$ and $R_{12}$ connected as shown.

With the system shown in Figure 3, at low values of input voltage and current only the series resistor 61 is in the circuit. As the current and voltage are increased, however, the shunt resistors $R_7$, $R_8$, and $R_9$ are successively connected in parallel to effect compression of positive half-cycles and the shunt resistors $R_{10}$, $R_{11}$ and $R_{12}$ are successively connected in parallel to effect different degrees of compression for negative half-cycles. Accordingly, the output appearing at the terminals 84 and 85 will be an alternating current proportional to the input voltage to a given exponent $n$.

It will be understood from the foregoing description that the invention provides highly effective circuits for receiving signal inputs and providing signal outputs that vary in accordance with any desired function of the signal input. Further, by combining a compressor circuit of this type with a conventional converter tube, outputs can be provided that are linearly proportional to a signal voltage and inversely proportional to any preselected function of another signal.

If, in the Figure 1 embodiment, one of the variables is available as a direct current whose amplitude varies in accordance with the amplitude of the variable, such direct current may be applied directly to the conductors 29 and 35. Also, the signal voltage applied to the grid 57 may be a D. C. voltage, if desired. Further, in the form of the invention shown in Figure 3, the input may be either alternating current or voltage. If alternating current is used, the series resistor 61 may be omitted.

The several specific circuits described above by way of example may be modified considerably within the scope of the invention. For example, the compressor portion may comprise as many parallel sections as desired and the components may be so selected as to provide compression in accordance with any desired mathematical relation. Other modifications will be apparent to those skilled in the art. The invention, therefore, is not to be limited save as defined by the appended claim.

I claim:

In an alternating voltage compressor network, a transmission channel having a resistor in series therewith and having a pair of input and a pair of output terminals, a first network connected across said channel and comprising a plurality of branches each including biasing means, a unilateral conducting means and a resistor in series, the first of said branches being connected directly across said channel and each successive branch being connected in parallel with the unilateral conducting device and resistor of the preceding branch, and a second network substantially identical with said first network but connected across said channel in inverted relation to said first network, whereby said first and second networks are effective to compress signals of opposite polarities in accordance with given functions thereof, said first and second networks affording shunt impedances across the channel which vary relatively to the fixed impedance of said resistor connected in series with the channel and as a function of the input signals impressed across said input terminals, said channel affording a substantially infinite impedance across said input terminals prior to operation of any of said branches.

WILLIAM WEST MOE.

REFERENCES CITED

The following references are of record in the file of this patent:

UNITED STATES PATENTS

| Number | Name | Date |
| --- | --- | --- |
| Re. 14,585 | Arnold | Jan. 14, 1919 |
| 1,776,822 | Strieby | Sept. 30, 1930 |
| 2,003,428 | Cowan | June 4, 1935 |
| 2,215,946 | Von Radinger | Sept. 24, 1940 |
| 2,240,289 | Dillenburger | Apr. 29, 1941 |
| 2,286,730 | Hall | June 16, 1942 |
| 2,434,155 | Haynes | Jan. 6, 1948 |
| 2,451,950 | Hipple | Oct. 19, 1948 |
| 2,463,553 | Olesen | Mar. 8, 1949 |